United States Patent
Essafi et al.

(10) Patent No.: US 6,229,931 B1
(45) Date of Patent: May 8, 2001

(54) PROCESS FOR THE SEARCH OF SAMPLES IN IMAGES OF A DATA BASE

(75) Inventors: Hassane Essafi, Orsay; Jean Michel Marie-Julie, Vitry-sur-Seine, both of (FR)

(73) Assignee: Commissariat a l'energie Atomique, Paris (FR)

( * ) Notice: Subject to any disclaimer, the term of this patent is extended or adjusted under 35 U.S.C. 154(b) by 0 days.

(21) Appl. No.: 08/928,142

(22) Filed: Sep. 12, 1997

(30) Foreign Application Priority Data

Sep. 26, 1996 (FR) .................................................. 96 11751

(51) Int. Cl.[7] .................................................. G06K 9/54
(52) U.S. Cl. .......................................... 382/305; 382/249
(58) Field of Search .................................... 382/305, 249, 382/199, 243, 244, 218, 282

(56) References Cited

U.S. PATENT DOCUMENTS

| | | | |
|---|---|---|---|
| 4,789,933 | 12/1988 | Chen et al. | 382/128 |
| 5,384,867 | * 1/1995 | Barnsley et al. | 382/56 |
| 5,701,369 | * 12/1997 | Moon et al. | 382/249 |
| 5,768,437 | * 6/1998 | Monro et al. | 382/249 |
| 5,781,899 | * 7/1998 | Hirata | 707/6 |
| 5,809,169 | * 9/1998 | Rezzouk et al. | 382/199 |

OTHER PUBLICATIONS

Patent Abstracts of Japan, vol. 95, No. 3, Apr. 28, 1995, JP 06-343140, Dec. 13, 1994.

Robert Bonneau, SPIE, vol. 2569, pp. 813-824, Jul. 12, 1995, "Using the Centroid Operator for Faster Multiresolution Image Compression and Pattern Recognition".

Ling Zhang, et al., IEEE Transactions on Neural Networks, vol. 7, No. 2, pp. 400-407, Mar. 1, 1996, "Generating and Coding of Fractal Graphs by Neural Network and Mathematical Morphology Methods".

* cited by examiner

*Primary Examiner*—Leo Boudreau
*Assistant Examiner*—Kanji Patel
(74) *Attorney, Agent, or Firm*—Oblon, Spivak, McClelland, Maier & Neustadt, P.C

(57) ABSTRACT

The present invention relates to the automatic search for an image sample (f') in images (f) of a data base. The sample and the images are compressed using their fractal properties, in the form of relations linking their ranges (R) to area or domains (D) of the same image. According to the invention, the comparison relates to indexes registering the geometrical characteristics of these relations. Various means are proposed for permitting a profitable search and in particular a limitation of the distance between ranges and domains of the image (f).

14 Claims, 6 Drawing Sheets

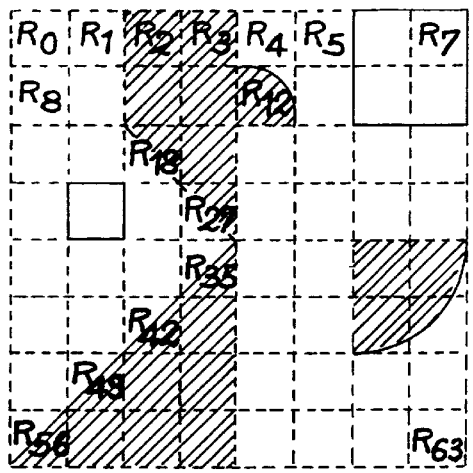
FIG. 1
FIG. 2
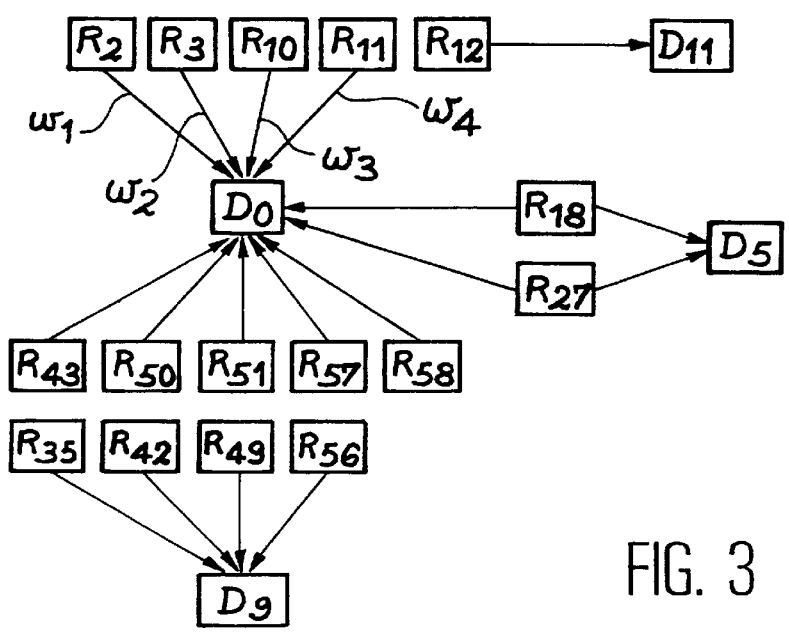
FIG. 3

PROCESS FOR THE SEARCH OF SAMPLES IN IMAGES OF A DATA BASE

BACKGROUND OF THE INVENTION

1. Field of the Invention

The invention relates to a process for the search for samples in images of a data base. Interest is here attached to the automatic search for a particular detail within a collection of images recorded in a data base.

2. Description of the Related Art

A simple solution consists of describing the images by a text or by keywords and checking the catalogue resulting from this description. The disadvantage of this very simple method is that it requires time for creating the catalogue and it is not possible to describe the images with sufficient precision or objectivity, particularly as the object of the search is not always known at this time and important elements of images would be neglected. Moreover, an element such as a building, vehicle, person, etc. will generally be described by the category of which it forms part and will consequently only be identified following a visual examination of the image in order to establish whether it does correspond to the sample. Thus, this method is not very practical for numerous data.

Another solution consists of seeking an object by describing its contour or texture and investigating it in the image data bank. For this purpose it is necessary to have digitally analyzed the images in order to extract the corresponding informations therefrom. Unfortunately there is no method for the extraction of a contour or texture of objects which is effective in all cases and such methods fail when the objects are partly masked or in the shade, or when they are differently illuminated on the sample and on one of the images Another possible method consists of comparing the sample with different parts of the images. The comparison is positive when the points of an image fragment have the same shade as the sample points. However, the calculation times are very long due to the number of comparisons which have to be made and the method also becomes inoperative if the sample is present with a different size or orientation on the images.

SUMMARY OF THE INVENTION

The invention is based on a different method involving the com-pression of images and samples in accordance with their fractal properties.

A fractal object has the property of being identical in its parts. On isolating therefrom a fragment which is enlarged, it is found to be identical to the initial object. The image of a fractal object can be obtained by means of certain geometrical transformations applied in repeated manner to a starting image, which is deformed and converges towards the fractal object, which is called the geometrical transformation attractor. Although conventional images are not really fractal objects, it is possible to define geomet-rical transformations of which these images are attractors. The image can then be reconstituted by applying these transformations several times to a random starting image. It is then only necessary to record the geometrical characteristics of the transformation. Thus, these transformations are determined by dividing the image into ranges and making correspond a domain or area of the same image, i.e. another part of the image having the same shape but a larger surface to each of the ranges. Thus, geometrical transformations able to produce an attractor are contracting, i.e. the details on which they act become smaller. The correspondences by which the ranges and domains are related are chosen so that the domains resemble the sectors with which they are associated, i.e. they have a similar aspect once there has been a possible imposition thereon of certain modifications of brightness, contrast, rotation or symmetry.

It is thus sufficient to record the image in the form of digital data relative to the transformations producing the same and illustrated by equation (1) $W_i=(Y_i,x_i,y_i,tx_i,ty_i,s_i,o_i)$. In reality, it is the writing of a transformation Wi in vector form, where Yi is a value designating an isometry among a previously documented list for passing from the domain to the associated range, such as a rotation, reflection, symmetry or scale modification, xi and yi being domain position coordinates, txi and tyi translation coordinates for passing from the domain to the associated range and si and oi are contrast and brightness coefficients making it possible to modify the grey levels in the domain to obtain those of the associated range. The contrast coefficient si makes it possible to regulate the difference of the grey levels of points of a range by modifying the equivalent difference among the points of the domain associated therewith. The brightness coefficient oi makes it possible to lighten or darken the range with respect to the domain. All the transformations form an index of the image. As the number of vectors is equal to the relatively small number of ranges of the image, the index occupies a much smaller memory volume than if the image had been completely recorded, in the form of a colour or a grey level associated with each of its points.

A specific example provides more detailed information. FIG. 1 shows an image, formed by a mosaic of two colours, showing a division into square ranges, numbered according to horizontal rows from R0 to R63 using a grid. FIG. 2 shows a division of the same image into sixteen domains, numbered from D0 to D15 and whereof each has the surface of four ranges and, like the latter, a square shape.

This simply shaped image makes it possible to easily relate the domains and ranges. Thus, the completely white ranges R0, R1, R4, R5, etc. have a physionomy identical to an entirely white domain such as D0 (or e.g. D3 or D14). The entirely black ranges such as R2 and R3 could be related with a completely black domain such as D1 or D13, but could also be related with domain D0, which has the same appearance to within a brightness change. The ranges such as R18 and R27 which are partly black and white in accordance with a diagonal will be related with the domain D5 of the same appearance and R35, R42, R49 and R56 with D9 for the same reason. Sector R12 will be related with domain D11, which has the same appearance, excepting a quarter turn rotation.

All these correspondence relations can be in the form of a graph, part of which is shown in FIG. 3. Specifically the application of the equations (1) consists, starting from an initial image on which are shown the domains D0 to D15, constructing a new image on which is documented for each of the ranges R0 to R63, the content of the domain associated with the initial image after applying thereto the necessary scale change and optionally modifications of brightness, orientation, etc. defined by the transformation wi. By repeating these operations, there will be a convergence towards the image of FIG. 1, no matter what the initial image.

The invention consists of applying this already known method of compression images in the form of geometrical transformations expressing their fractal properties to the search for samples on these images. In its most general form, it consists of applying the same compression method to samples in order to obtain other numerical indexes, of the same nature as those of the images, and appropriately comparing the indexes of the samples with the indexes of the images in order to establish whether the samples are present on the images. However, certain precautions must be taken to ensure that the comparison can in fact be made. It is in particular appropriate for the fragments (domains and ranges) brought into a similarity relationship in the image indexes are not further removed than a limit commensurate with the dimensions of the samples.

BRIEF DESCRIPTION OF THE DRAWINGS

The invention is described in greater detail hereinafter with reference to the attached drawings, wherein show:

FIGS. 1, 2 and 3 The manner of compressing an image with the aid of its fractal properties.

DESCRIPTION OF THE PREFERRED EMBODIMENTS

Figure 4:
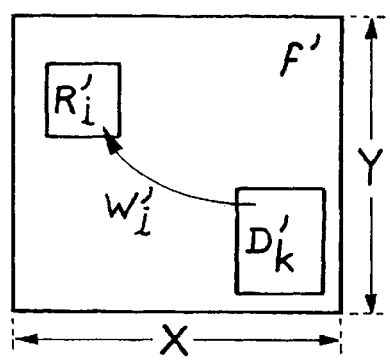
FIGS. 4 and 5 The principle of compressing a particular image on which the invention is based.
Figure 5:
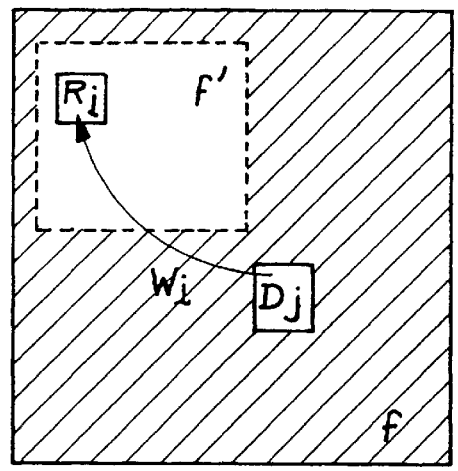

FIGS. 4 and 5 show a sample f' and an image f on which said sample is present. An index of the sample f' is formed in accordance with the previously described principle by associating with each of its ranges R'i a domain D'k by means of a transformation w'i. However, FIG. 5 shows that if the sample f' is included in a much broader image f, the domain Dj which will be associated with the range Ri similar to the range R'i defined hereinbefore will usually be chosen outside the limits of the sample f' on the rest of the image f. Thus, the afferent transformation wi will be different from w'i, which means that it will be impossible to recognize that Ri and R', i are similar. For a large number of other ranges of the sample f', it will be impossible to recognize whether it is located on the image and the search will consequently be unprofitable and incorrect.

Thus, according to the invention, the images such as f will be compressed only admitting transformations wi involving translations txi and tyi, i.e. distances between the range Ri and domain Di less than a conventional limit. This limit will be commensurate with the forecastable dimensions of the samples, i.e. as close as possible to these dimensions, without it being necessary to seek an absolute equality. Thus, it is possible to recognize the presence of a sample on an image without identifying all its ranges thereon. It is sufficient for identity to exist between sufficiently large transformations wi and w'i. For example, it is possible to choose as the limit one of the two dimensions X and Y of a rectangular sample f'.

However, this manner of proceeding suffers from the disadvantage that the choice of the domains Di to be associated with the ranges Ri is restricted, so that the ranges Ri will often be evaluated by means of less similar domains and the reconstruction of the image will be less satisfactory.

It is therefore advisable to compress said image of the data base several times, once in the conventional manner, without imposing a distance limit for the transformations wi, and one or more times by imposing the same number of distances as forecastable sample sizes. The search of the sample on the image will then involve an automatic stage according to the invention of comparing indexes by choosing the index of the image associated with the limit most comparable with the size of the sample. If the comparison appears to be positive, the image could be reconstituted in order to be examined with the aid of the index with the limit-free transformations.

However, it must be accepted that the comparison of the indexes between the sample ranges and the ranges of all the images involves a significant calculation time. An improvement to the process makes it possible to obviate this disadvantage by eliminating superfluous calculations. It would be possible to work on reduced size images, but the reconstitution of smaller details would then be impossible. It is therefore recommended that the comparison of the indexes only takes place on the parts of the image and the sample having the most numerous informations, to the detriment of the more uniform zones of the image generally corresponding to the background thereof or within objects represented by it. The discrimination of the interesting ranges takes place by considering their standard deviation $\sigma$, which is high for textured zones of the image having a large number of light and dark areas and low for uniform areas. The standard deviation of each range is calculated on the statistical distribution of the grey levels of its points.

Figure 6:
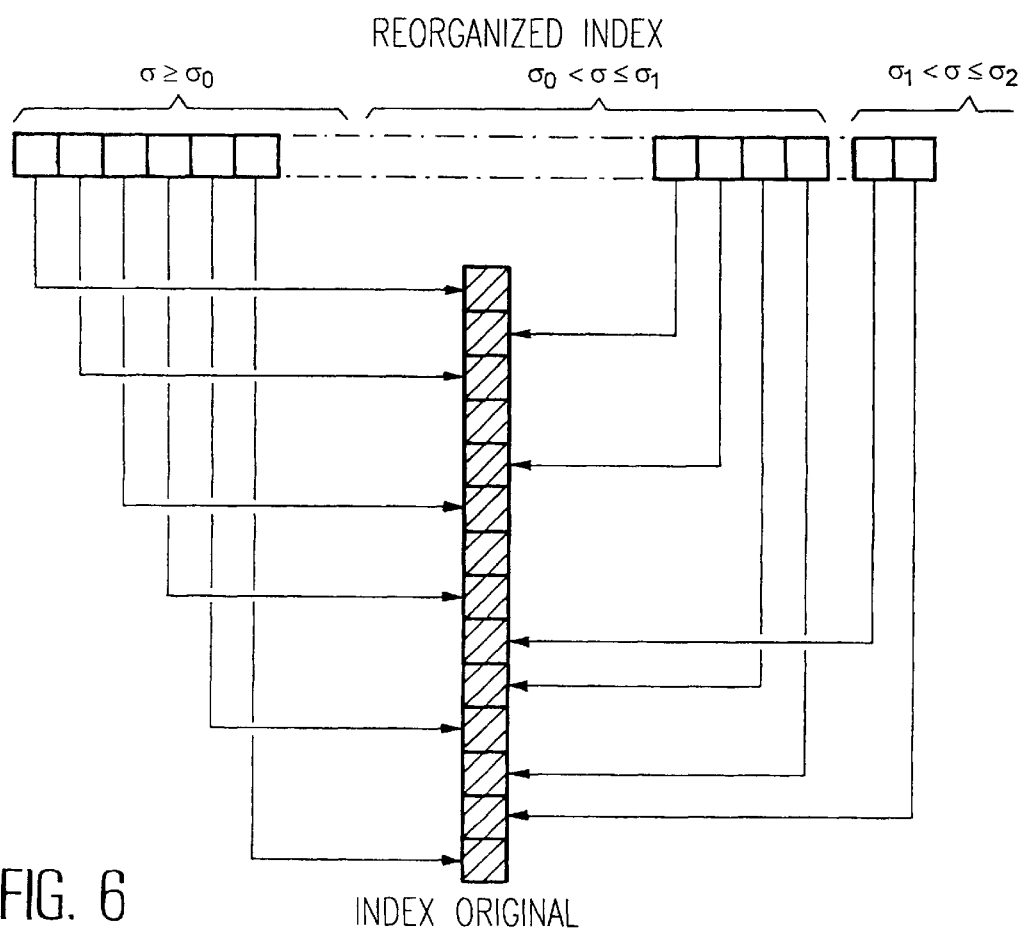
FIG. 6 An image index organization procedure.

The index of the image and that of the total sample can then be freed of uniform zones having little interest, which significantly speeds up the comparison time. Here again, the improvement proposed for facilitating the implementation of the invention suffers from the disadvantage that informations are lost when the image has to be reconstituted, because the excluded ranges are no longer correctly filled and consequently do not contribute to the reconstitution. Therefore, although the summary index to which the comparison relates is also used in the reconstitution of the image, preference is given to the classifying of the parts of the index by categories, the transformations wi associated with standard deviations $\sigma i$ being grouped according to different standard deviation ranges limited by threshold values such as $\sigma 0$, $\sigma 1$, etc. This is shown in FIG. 6. The transformations wi of the ranges with the greatest standard deviations are at the top and only these transformations are compared with those of the sample.

It is also necessary to examine the situation where the sample is present on the image, but with a different scale. Here again, the indexes would not be appropriately compared and the search would be both unprofitable and incorrect.

Figure 7:
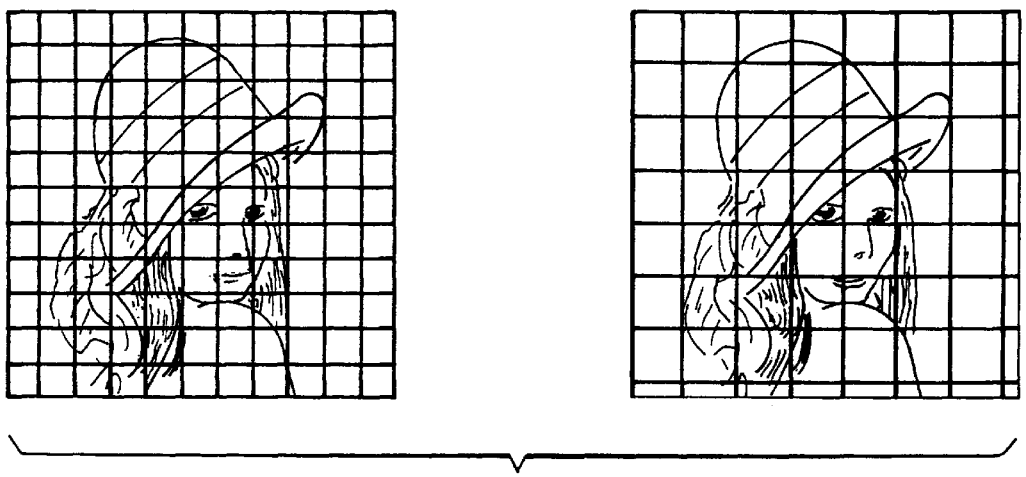
FIG. 7 A possible procedure for sample searching with different division scales on the image.

It is possible to divide the same image several times by grids having different spacings (FIG. 7) with the hope that they divide the sought detail in substantially the same way, i.e. with the same number of fragments as the sample, but this procedure is costly because an index has to be calculated for each of the grids. Another improvement provided by the invention can also lead to good results.

This novel aspect of the invention consists of exploiting the size difference between the ranges and domains in order to generalize the relating of these elements of images with successive levels corresponding to ever more approximate divisions of the image.

Figure 8:
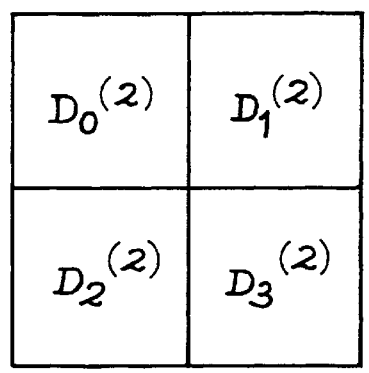
FIGS. 8, 9 & 10 An image compression with a less precise image division level and how to create a corresponding index.

On returning to the example of FIGS. 1 to 3, the image can again be broken down into four superdomains $D_0^{(2)}$ to $D_3^{(2)}$ which, as shown in FIG. 8, in each case cover four domains (respectively D0, D1, D4, D5; D2, D3, D6, D7; D8, D9, D12, D13; D10, D11, D14, D15). It is then possible to deduct relations identical to those of FIG. 3 in order to reduce the content of the domains as from the superdomains and these relations could be incorporated into the image compression index. Proceeding in this way over a certain number of levels, there is an increase in the chance of identifying a sample present at a different scale on the image. It is sufficient for it to be divided with a random image division level in the same way as on the actual sample, i.e. with the same number of fragments.

Figure 9:
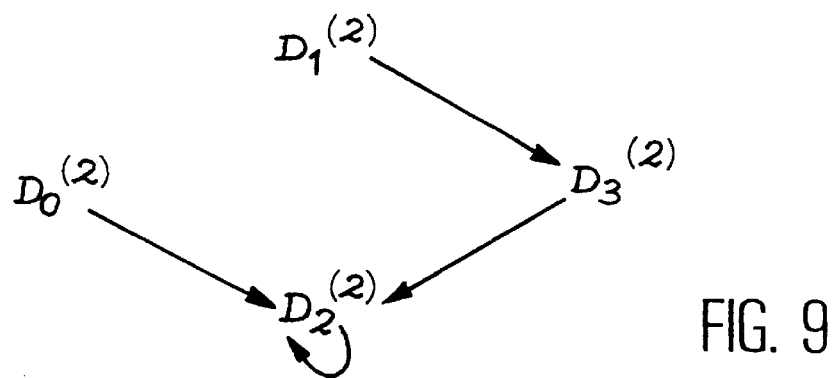

However, this method requires the establishment of transformations wi at all the image division levels, leading to long calculation times. Another idea giving good results consists of producing graphs of relations between the elements of a same image division level. FIG. 9 shows such a graph at the level of the superdomains $D_0^{(2)}$ to $D_3^{(2)}$ of FIG. 8. For obtaining elements (domains) of the superdomains, it is necessary to seek them in other superdomains in the direction of the arrows. Thus, the superdomain $D_1^{(2)}$ can at least partly be reconstituted from elements of the superdomain $D_3^{(2)}$, which can itself be partly reconstituted from elements of the superdomain $D_2^{(2)}$.

It is easy and inexpensive to produce these graphs, because it is merely necessary to take the information from FIG. 3 between domains and ranges and group them replacing the ranges by the domains to which they belong. This gives the graph of FIG. 10 (R2, R3, R10 and R11 having been replaced by D1; R35 and R42 by D9; R12 by D2, etc.). The same process makes it possible to obtain other graphs such as that of FIG. 9 by replacing the domains of FIG. 10 by superdomains or elements of other division levels of the image f.

After having acted in the same way for the sample f', two sets of graphs are obtained which can be individually compared to establish whether the sample is on the image at a different division level, i.e. a different scale.

Another way for reducing the number of comparisons and the calculation times consists of again having a selection of transformations wi of the image on the basis of the values of the translations txi and tyi. Then consideration will only be given to those whose translation values are lower than thresholds, i.e. for which $txi \leq X$ and $tyi \leq Y$. This process has similarities with the main process of the invention, which consists of limiting the value of txi and tyi by compressing the image. The process here is then applied and makes it possible to impose lower thresholds X and Y according to the size of the sample, which could not be known beforehand. It is a type of threshold adjustment, which the operator can choose at random according to the search characteristics, but whose disadvantage is to reduce the number of informations to which the comparison relates, unlike in the main process.

The results of the search can be evaluated by scores or percentages representing the number of transformations w'i matched with transformations wi, or sample ranges having a homolog on an image for a possible position of the sample on the image. In the best possible case, i.e. if the superimposing is perfect, the identical division and the domains linked with the ranges all in the periphery of the sample, the score is 100%. A positive diagnosis can in fact be established with a much lower score.

Figure 11:
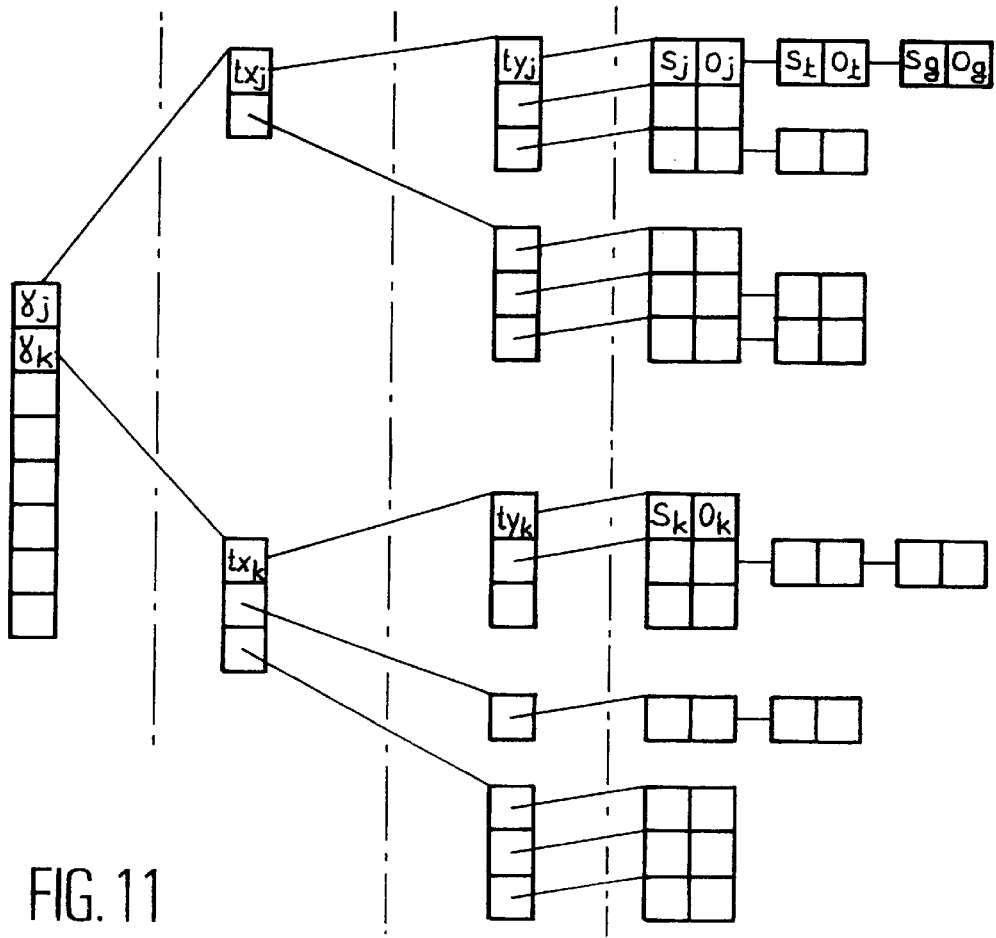
FIGS. 11 and 12 Automatic search procedures in the image indexes.

Reference should now be made to FIG. 11 for a more specific explanation. The values of the compression transformations wi of each image f are brought together in tree form on the basis of their common elements, each of the isometry values γ generally being connected to a plurality of translations tx, each of these translations with a plurality of orthogonal translations ty and each of these orthogonal translations with a plurality of pairs of contrast and brightness coefficients s and o. All the parameters of the transformation wi are used for the comparison with the exception of the positions x and y.

Each transformation vector w'i of the same f' is therefore compared with the transformations wi of the image f seeking an identical isometry value and then successively translations tx, ty and identical coefficients s and o. The score of the search on an image is consequently the ratio between the number of transformations w'i compared successfully with at least one transformation wi of the image f and the total number of transformations w'i. The result of the comparison is dependent on a resemblance criterion between the transformations wi and w'i. If the isometry values γ and translation values tx and ty are identical, calculation will then take place of a distance such as $\sqrt{(si-s'i)^2+(oi-oi)^2}$ or $\sqrt{(si-s'i)^2}$ between the transformations wi and w'i in question. The comparison is profitable if said distance is below one threshold.

Figure 10:
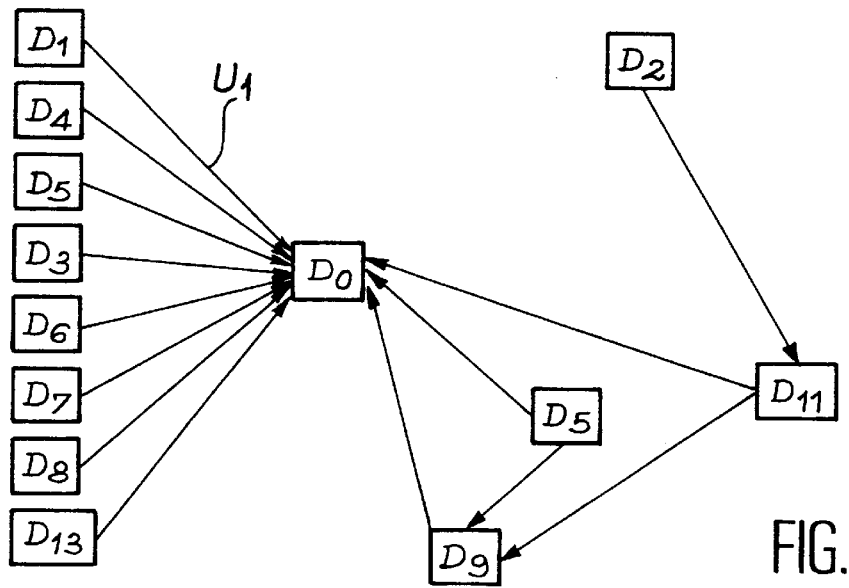
Figure 12:
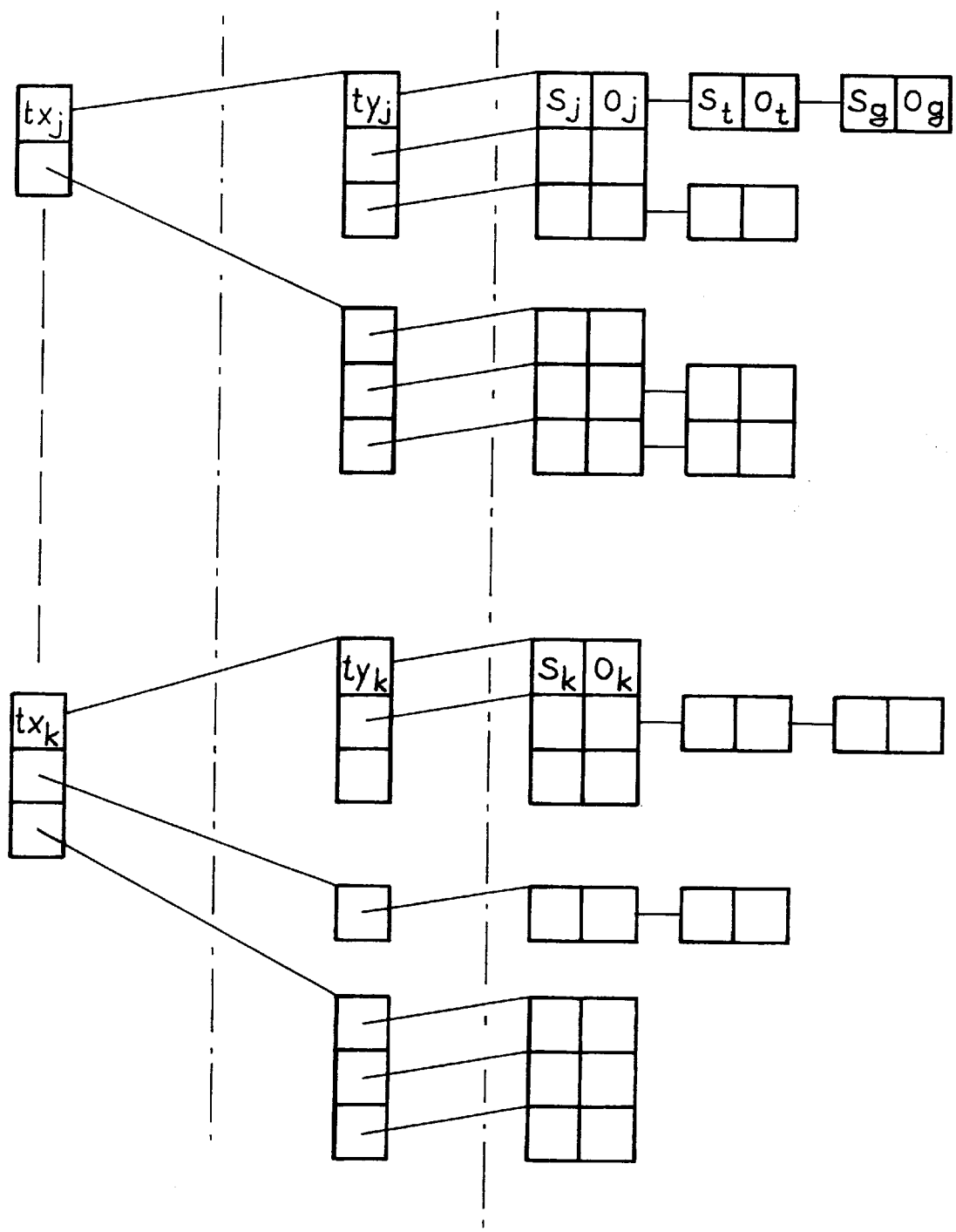
Figure 13:
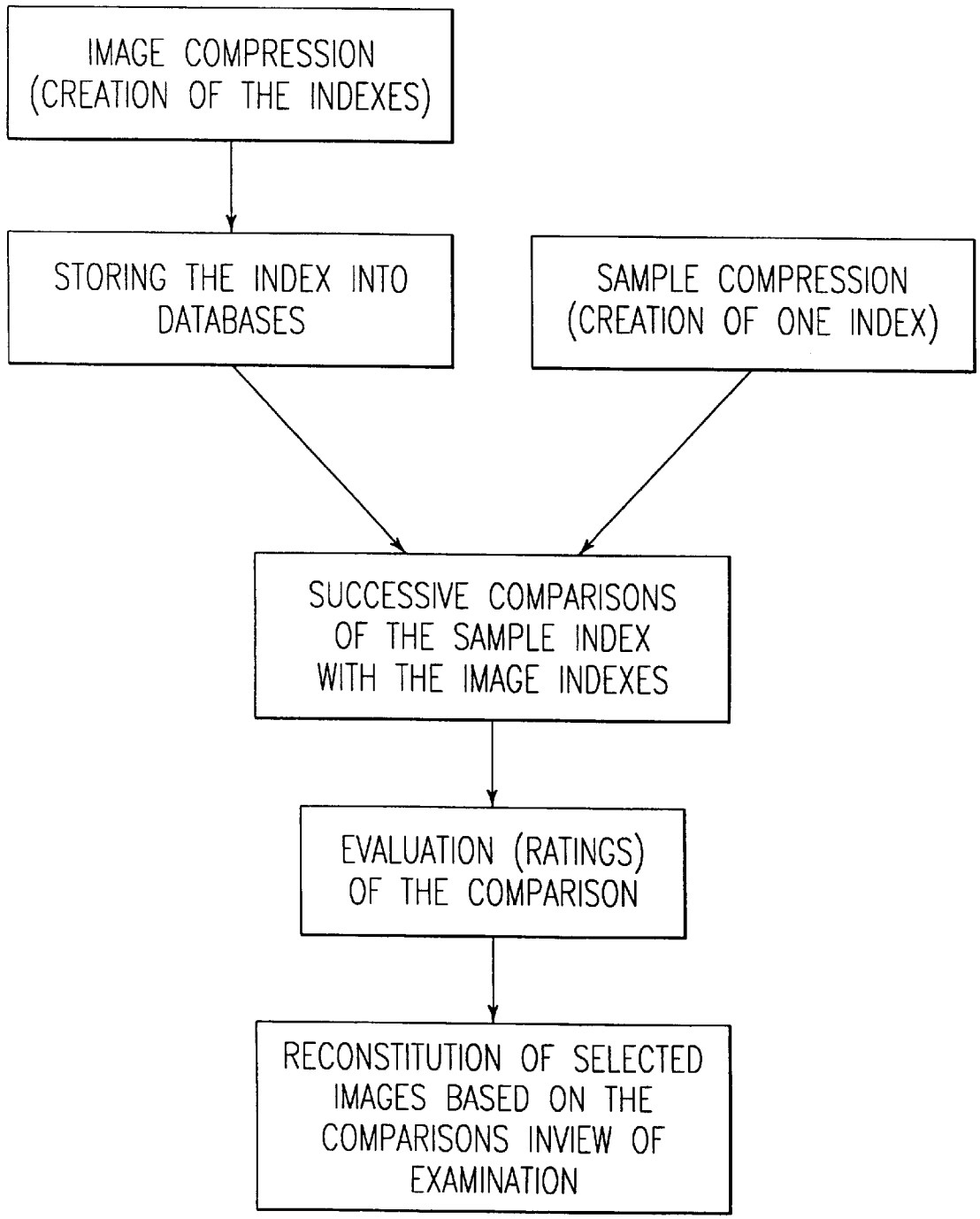
FIG. 13 The fundamental stages of the process according to the invention.

An identical process explained with the aid of FIG. 12 is used if the comparison relates to the graphs of FIGS. 9 and 10. Each of the vectors Ui of one of the graphs is expressed by the relation (2) Ui=(xi yi txi tyi si oi vi), where xi and yi are the coordinates of the element (domain, superdomain, etc.) located at the point of the vector Ui, txi and tyi. The translations passing from the element located at the origin of the vector Ui to the element located at its point, si and oi being mean values of similar coefficients present in the vectors or the transformations wi of the lower division level of the image grouped to form Ui and the new coefficient vi is equal to the total number of grouped elementary level transformations wi. Thus, the vector U1 of FIG. 10 linking the domains D1 to D0 results from the grouping of the transformations w1, w2, w3 and w4 of FIG. 3 respectively linking the ranges R2, R3, R10 and R11 (composing the domain D1) with domain D0, its contrast and brightness coefficients being $$s(U1) = \frac{1}{4}[s(w1) + s(w2) + s(w3) + s(w4)],$$

$$o(U1) = \frac{1}{4}[o(w1) + o(w2) + o(w3) + o(w4)] \text{ and } v(U1) = 4.$$

The coefficients v are used for weighting the coefficients s and o for establishing graphs of higher levels (e.g. that of FIG. 9).

FIG. 12 shows that the comparison relates to the translations tx and ty, the isometry values having disappeared, and then to the coefficients s and o. The comparison criteria can be the same as for FIG. 11.

The invention can be used in numerous fields, e.g. the exploitation of aerial or satellite photographs, detection for monitoring and security purposes, medical imaging, publicity and in general terms all fields where it is necessary to examine a considerable quantity of images seeking a specific detail or those in which the decision must be automatically taken, e.g. for recognizing a shape on the surface of a star or for identifying a face.

What is claimed as new and desired to be secured by Letters Patent of the United States is:

1. Process for the search for samples (f') in images (f), characterized in that it consists of compressing the samples (f') and images (f) in order to obtain numerical indexes expressing fractal properties of the samples and images and in particular similarity relations between different portions (R, D) of the same sample or the same image, and comparing the indexes of the samples with the indexes of the images, the portions of the same image brought into a similarity relationship in the image indexes being no more remote than a limit commensurate with the dimensions of the samples.

2. Process for the search for samples of images according to claim 1, characterized in that the images are compressed several times and have several indexes associated with different limits and in that one of said indexes is chosen for each image in accordance with the dimensions of the samples.

3. Process for the search for samples of images according to claim 1, characterized in that the images are compressed several times and also have a limit-free index, by which the images are reconstituted.

4. Process for the search for samples of images according to claim 1, characterized in that the images are compressed several times and have several indexes, the portions brought into similarity relationship in the indexes having image ranges (R) obtained by dividing the images by grids, the grids having different spacings for each of the indexes.

5. Process for the search for samples of images according to claim 1, characterized in that the portions brought into similarity relationship consist of image ranges obtained by dividing the images by grids and image domains (D) obtained by agglomerating several contiguous ranges (R).

6. Process for the search for samples of images according to claim 5, characterized in that the portions brought into similarity relationship also incorporate successive agglomerations (D2) of image domains (D).

7. Process for the search for samples of images according to claim 1, characterized in that the indexes of samples and images undergo a selection in order to retain for comparison purposes only the portions of samples and images having a high brightness distribution standard deviation ($\sigma$).

8. Process for the search for samples of images according to claim 7, characterized in that the indexes of images are classified into categories corresponding to different standard deviation ranges.

9. Process for the search for samples of images according to claim 1, characterized in that the indexes of samples are compared with those of images so as to give a result equal to a percentage of elements of the indexes of the samples substantially identical to homologous elements of indexes of images.

10. Process for the search for samples of images according to claim 6, characterized in that the portions brought into similarity relationship comprise image domains (D) brought into a similarity relationship with one another and the successive agglomerations (D2) brought into similarity relationship with one another.

11. Process for the search for samples of images according to claim 5, characterized in that the indexes comprise translations (tx, ty) between the different portions brought into similarity relationship in the indexes.

12. Process for the search for samples of images according to claim 11, characterized in that the indexes comprise contrast coefficients.

13. Process for the search for samples of images according to claim 12, characterized in that the indexes comprise brightness coefficients (o).

14. Process for the search for samples of images according to claim 11, characterized in that the indexes comprise geometrical relations ($\gamma$) between different portions brought into similarity relationship in the indexes.

* * * * *